(12) United States Patent
Bell et al.

(10) Patent No.: US 8,646,493 B2
(45) Date of Patent: Feb. 11, 2014

(54) METHOD AND APPARATUS FOR CHANGEOVER OF CONTAINER IN A FLUID DISPENSER

(75) Inventors: Ian Tyler Bell, Milton (CA); Steven Lloyd Siverns, Hamilton (CA)

(73) Assignee: EnviroTower Inc., Toronto, Ontario (CA)

( * ) Notice: Subject to any disclaimer, the term of this patent is extended or adjusted under 35 U.S.C. 154(b) by 965 days.

(21) Appl. No.: 12/715,983

(22) Filed: Mar. 2, 2010

(65) Prior Publication Data

US 2010/0218844 A1  Sep. 2, 2010

Related U.S. Application Data

(60) Provisional application No. 61/156,855, filed on Mar. 2, 2009.

(51) Int. Cl.
*B65B 1/04* (2006.01)
*B65B 3/04* (2006.01)

(52) U.S. Cl.
USPC ............. 141/9; 141/104; 141/100; 141/248

(58) Field of Classification Search
USPC ......... 141/2, 18, 126, 9, 13, 35, 302, 99, 248, 141/100, 104; 222/265, 280, 275
See application file for complete search history.

(56) References Cited

U.S. PATENT DOCUMENTS

| | | | | |
|---|---|---|---|---|
| 4,673,008 A | * | 6/1987 | McDermott | 141/198 |
| 5,186,362 A | * | 2/1993 | Biagi, Jr. | 222/136 |
| 5,215,128 A | * | 6/1993 | Neeser | 141/59 |
| 5,294,916 A | * | 3/1994 | Bolton et al. | 340/606 |
| 5,544,951 A | * | 8/1996 | Alack | 366/163.2 |
| 5,586,588 A | * | 12/1996 | Knox | 141/285 |
| 5,751,599 A | * | 5/1998 | Bortnik et al. | 700/274 |
| 5,811,012 A | * | 9/1998 | Tanabe et al. | 210/669 |
| 6,105,638 A | * | 8/2000 | Edwards et al. | 141/330 |
| 6,581,623 B1 | * | 6/2003 | Carpenter et al. | 137/113 |
| 6,820,661 B1 | * | 11/2004 | Heimert | 141/198 |
| 7,104,292 B2 | * | 9/2006 | Wodjenski | 141/248 |
| 7,168,458 B2 | * | 1/2007 | Benham | 141/2 |
| 7,810,516 B2 | * | 10/2010 | Gerken | 137/113 |
| 2007/0068875 A1 | * | 3/2007 | Dart et al. | 210/696 |
| 2010/0037982 A1 | * | 2/2010 | Bangs et al. | 141/9 |

* cited by examiner

*Primary Examiner* — Timothy L Maust
*Assistant Examiner* — Robert Bell, III
(74) *Attorney, Agent, or Firm* — Stuart L. Wilkinson

(57) ABSTRACT

In a method and apparatus for changeover of containers of a highly soluble substance in a continuous flow process, fluid is flowed through a container of the substance to generate a solution until the substance is depleted and the concentration of the solution starts to drop. The solution from the first container is then directed through a second container containing a charge of the substance to maintain a saturated solution. When the first container is fully exhausted, the flow of fluid is switched to isolate the first container and to flow the fluid directly into the second container whereupon the first container can be safely removed. The arrangement is operated as a lead lag system with solution flowing through the containers at or close to plug flow to minimize mixing.

9 Claims, 3 Drawing Sheets

METHOD AND APPARATUS FOR CHANGEOVER OF CONTAINER IN A FLUID DISPENSER

CROSS REFERENCE TO RELATED PATENTS

This patent application is claiming priority under 35 USC §119 to a provisionally filed patent application entitled Method and Apparatus for Changeover of Container in a Fluid Dispenser, having a provisional filing date of Mar. 2, 2009, and a provisional Ser. No. 61,156,855.

FIELD OF THE INVENTION

This invention relates to a method and apparatus for handling concentrated solutions and has particular application in continuous flow systems for changeover of a container of source solution.

DESCRIPTION OF RELATED ART

In handling highly concentrated solutions in a continuous flow process, it is periodically necessary to recharge source solutions. This is desirably achieved by exchanging a container which has been exhausted of the source solution by a new container containing a fresh charge of the solution. If the solution is toxic, manual handling can be hazardous both from the viewpoint of the container that is to be replaced and the replacement container. It is desirable that the container to be replaced should to the extent possible be free of any residual solution or be diluted to such an extent that discarding the container contents does not present an environmental or safety problem.

SUMMARY OF THE INVENTION

According to one aspect of the invention, there is provided a method of handling a concentrated solution of a substance in a fluid comprising flowing the fluid from a source into a first container containing a first charge of the substance to generate a solution of the substance in the fluid, flowing the solution from the first container to a sink, upon approaching exhaustion of the first container, flowing the solution from the first container into a second container containing a second charge of the substance to dissolve the substance of the second charge in the solution from the first container and flowing the solution from the second container to the sink, upon full exhaustion of the first container, isolating the first container from the flow of the fluid from the source by redirecting the fluid from the source to bypass the first container and to flow directly into the second container, and replacing the exhausted first container with a replacement first container containing a third charge of the substance. Preferably, in a modified lead-lag process, the method further comprises continuing to direct the fluid from the source into the second container, upon approaching exhaustion of the second container, flowing the fluid from the second container into the replacement first container to dissolve the substance of the third charge in the solution from the second container, upon full exhaustion of the second container, isolating the second container from the flow of the fluid from the source by redirecting the fluid to bypass the second container and to flow directly into the replacement first container, and replacing the exhausted second container with a replacement second container containing a fourth charge of the substance.

In a continuous flow aspect of the invention, the method can further comprise repeating the sequence of steps to effect alternating full exhaustion of the first and second containers and replacement thereof by respective replacement first and second containers containing charges of the substance. Preferably, parameters for solution flow through the containers are chosen so that the fluid flow is at least close to plug flow whereby to achieve low mixing of the solution in the course of its flow through the containers. The substance can be a particulate solid that is dissolved by passage of the fluid therethrough. Alternatively, the substance can be a concentrated solution that is dissolved by combining a metered quantity of the concentrated solution with the fluid. The method is adapted for use with highly soluble substances whereby the solution exiting each container other than during approaching exhaustion and full exhaustion of such container is saturated with the substance. In a preferred use of the invention for treatment of cooling tower water, the particulate solid is zinc chloride and the fluid is water. In such a cooling tower implementation, a main fluid line can extend between the source and the sink, with the first and second containers forming part of a sub-system that is in valved fluid communication with the main fluid line. Preferably, a back pressure is introduced in the main fluid line, which back pressure is transmitted into the solution in the sub-system.

According to another aspect of the invention, there is provided apparatus for handling a concentrated solution of a substance in a fluid comprising a source of the fluid, a sink for the fluid, and a sub-system in fluid communication with the source and the sink, the sub-system having a first container for containing a first charge of the substance, a second container for containing a second charge of the substance, and a plurality of pipe sections and a plurality of valves, each valve selectably operable to open and close, respectively to permit and to prevent flow of solution through a respective associated one of the pipe sections, the pipe sections and valves operable in a first configuration to flow fluid from the source into the first container to generate a solution of the substance in the fluid and to flow the solution from the first container to the sink, operable in a second configuration e to flow the solution from the first container into the second container to generate a solution of the substance of the second charge and to flow the solution from the second container to the sink, and configurable in a third operating phase to flow the fluid from the source directly into the second container whereby to isolate the first container from the flow of the fluid from the source and to permit replacement of the first container by a replacement first container. The pipe sections and the valves are preferably configurable in a fourth operating phase to flow the solution from the second container into the replacement first container to dissolve the substance of the replacement first container and to flow the solution from the replacement first container to the sink, and configurable in a fifth operating phase to flow the fluid from the source directly into the first replacement container and to isolate the second container to permit replacement thereof by a replacement second container containing a fourth charge of the substance.

The apparatus preferably further includes a main fluid line between the source and the sink, and a subsidiary fluid line between the source and the sink, the sub-system forming a part of the subsidiary fluid line. The apparatus can include control means to control rate of flow of the solution through the containers to obtain a solution flow which is at least close to being a plug flow, whereby to limit mixing of the solution flowing through the containers. The apparatus can also include a means for introducing a back pressure in the fluid flowing from the source to the sink through the sub-system.

The apparatus is preferably implemented with a cooling tower, the cooling tower effectively forming both the source and the sink, the cooling tower adapted to effect cooling by the flow of the solution containing the dissolved substance. In such an implementation, a suitable substance is highly soluble particulate zinc chloride, the zinc content having value in treating organic contaminants in the water.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
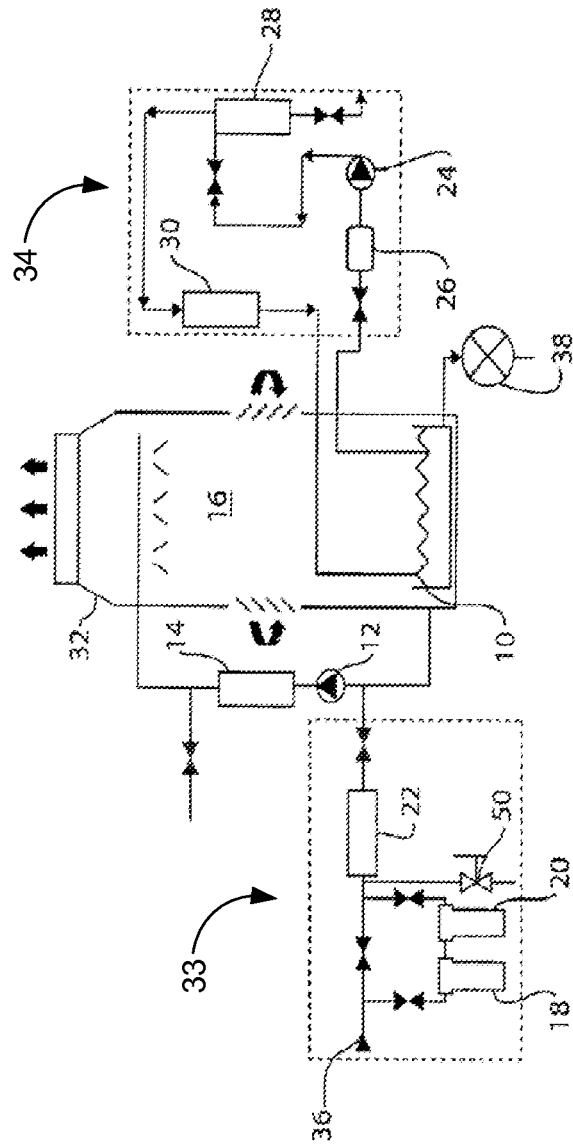
FIG. 1 is schematic view of a water treatment arrangement for treating water for use in a cooling tower.

FIG. 1 is a schematic representation of a cooling tower and water treatment system comprising a cooling tower 32, a module 33 for treating make-up water that is injected into the system to replace water that is lost owing to evaporation and sump discharge or "blow-down", and a module 34 for treating recirculating water from the cooling tower.

The cooling tower has a recirculating pump 12 to circulate cooled water from tower sump 10 through the condenser side of a heat exchanger 14, where it picks up building heat from the evaporator side of the heat exchanger 14. The heated water is piped to a spray bar system 16 mounted at the top of the tower 32. The water from the spray bars 16 cools as it cascades down into the tower sump 10, and then is piped back into the condenser side of the heat exchanger 14.

The water treatment module 33 includes a make-up water line 36 which discharges fresh water into a tower sump 10. Some of the incoming make-up water is flowed through a particulate iodine container 18 and a particulate zinc or zinc salt container 20 in order to provide metered, low levels of iodine and zinc, to suppress bio-organic contamination and otherwise condition the water. The incoming make-up water also passes through a physical type, self-cleaning water conditioner 22, which inhibits the formation of scale, dissolves old scale and inhibits corrosion.

The module 34 includes a pump 24 that recirculates the tower sump water through a strainer 26, a physical type, self-cleaning water conditioner 30, and a centrifugal separator 28. The strainer 26 removes large particles and any debris from the recirculating water. The conditioner 30 causes the water to enter an unsaturated state and produces large calcium carbonate particles, which coagulate with organic content in the recirculating water. The centrifugal separator 28 removes from the recirculating water particles that are over about 40 microns in size. At the cooling tower sump, a timer controlled blow-down valve 38 is operated periodically to remove water from the sump to reduce the level of dissolved contaminants and particles below a size at which they are removed by the separator 28.

Figure 2:
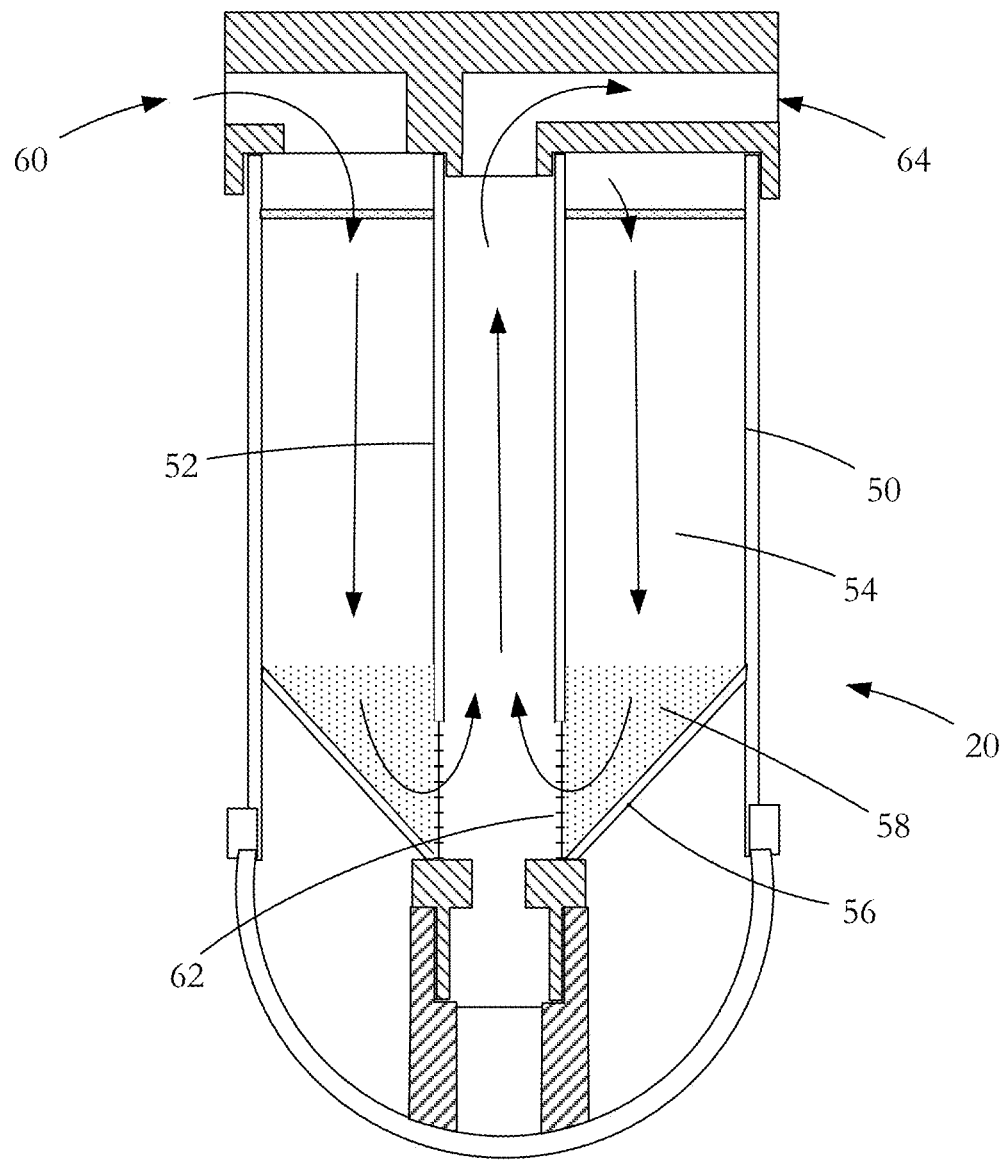
FIG. 2 is vertical sectional view though a container for use in a water treatment zone of the arrangement of FIG. 1.

A preferred zinc source for use in the make-up water treatment module 33 is powdered zinc chloride which has a high solubility in water, of the order of 3.88 g/mL at 22 C. Suitable apparatus for dissolving the zinc chloride powder is shown in FIG. 2. In this apparatus, a container has an outer tube 50 which is closed at its bottom end, and an inner tube 52 mounted within the outer tube. Extending between the inner and outer tubes is a generally annular chamber 54 which is closed by a cone 56 at its base. Within the cone is lodged a charge of zinc chloride 58. An inlet passage 60 allows fresh water to be pumped into the top of the annular chamber between the inner and outer tubes. Under the pump action, the water moves down through the annular chamber and onto the top of the zinc chloride mass to promote dissolution of the zinc chloride in the water. The saturated zinc chloride solution passes through a screen 62 into the inner tube where it is pushed upwardly by the fluid flow and eventually passes through an outlet passage 64 and into a main line servicing the cooling tower (not shown). Movement of the solution through the inner tube 52 is at least close to plug flow whereby mixing of solution moving up through the tube is minimized.

Due to its extreme solubility, saturated solutions of zinc chloride are very concentrated and toxic. Consequently, solutions of zinc chloride must be carefully handled and dispensed. In particular, care is needed when replacing an exhausted container of source zinc chloride, both with respect to the container to be replaced and the replacement container. It is desirable that the container to be replaced is either empty of all zinc chloride or that the zinc chloride is at such a low level that discarding the container and its contents does not present an environmental risk.

Figure 3:
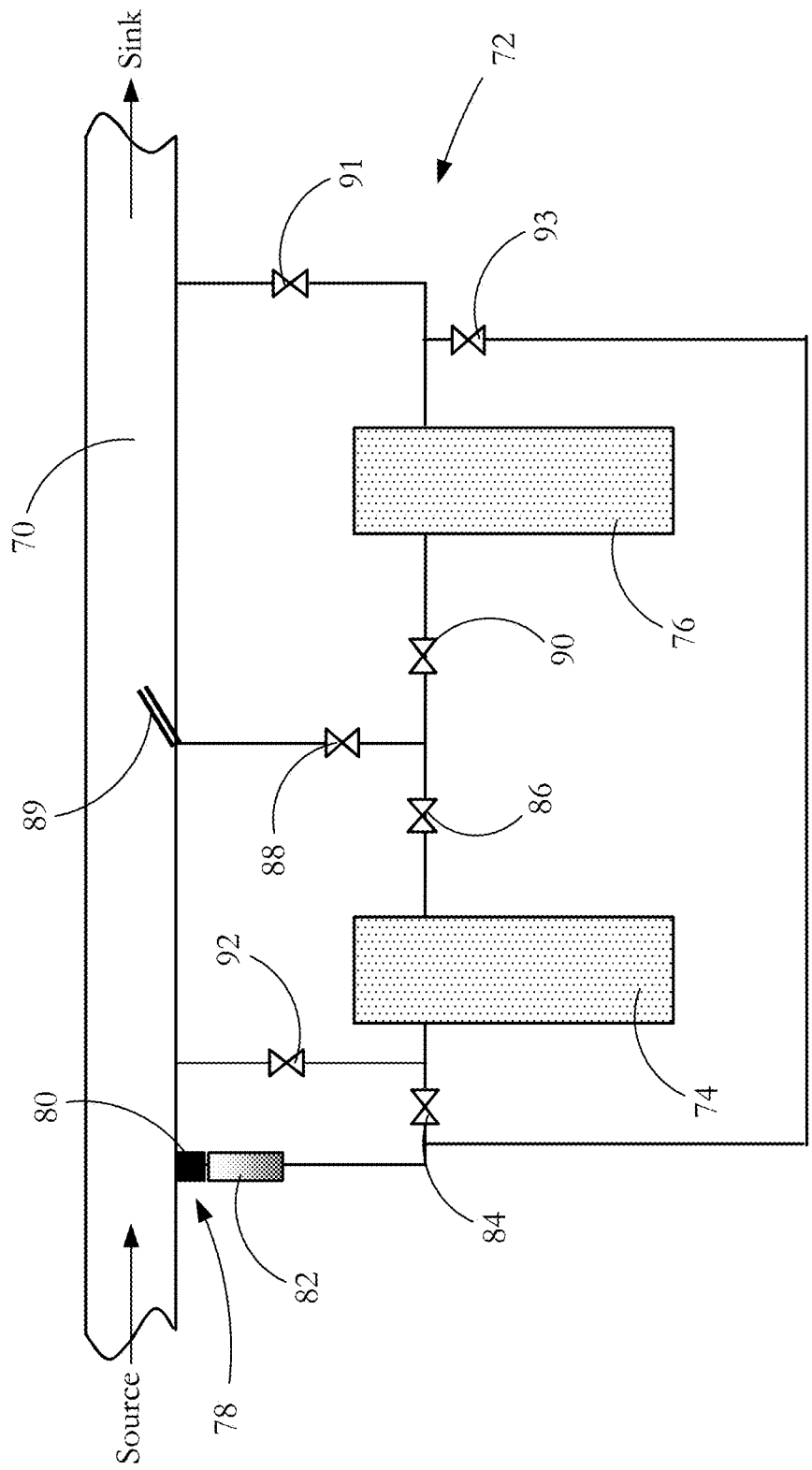
FIG. 3 is a schematic view of a sub-system for effecting changeover of substance containers in a continuous flow process adapted for use in a water treatment arrangement of the type illustrated in FIG. 1.

Referring to FIG. 3, an apparatus is shown that is particularly adapted for container replacement. The apparatus includes a main fluid line 70 which can be viewed as an element of the water recirculating system for the cooling tower of FIG. 1, the cooling tower in effect being a source of water to be treated with the zinc chloride and being a sink for the water that has been so treated. In fluid communication with the main fluid line is a dosing control sub-system, shown generally at 72 that is used to deliver metered quantities of zinc chloride into the water flowing through the main fluid line 70. The sub-system has two canister type containers 74, 76 of the type illustrated with respect to FIG. 2 and is particularly adapted for changeover of exhausted containers for replacement by new charged containers. The sub-system includes pipe work linking the containers to each other and to the main fluid line 70 and a number of valves 84, 86, 88, 90, 91, 92, 93 which are turned on or off depending on the desired flow configuration of the solution flowing in the sub-system 72.

In the operating configuration of the containers, water or solution enters the container 74 from the left as shown in FIG. 3 and enters the container 76 from the right, with solution exiting on the opposite side of the respective container, the containers being operated in a lead-lag sequence. Associated with the containers is a tee 78 from the main fluid line feed directly into the sub-system 72, the tee having an associated flow controller 80 and a timer-controlled solenoid valve 82 to control dose length and frequency. Downstream of the tee 78 and a dosing port 89 in the main fluid line is a throttling valve (not shown) which serves to generate back pressure within the sub-system. Downstream of the solenoid valve 82 in the dosing system, the plumbing splits into two. A straight-through line is used for dosing from the container 74 and a teed off line is used for dosing from the container 76 via valve 93. Tubing between the containers is used both to inject doses of solution into the system and also, as will be described presently, to empty the de-saturated contents of one container into the other. This tubing also contains a sampling port for the containers.

The containers 74 and 76 have associated vents to the main fluid line 70 to purge the containers of air when the containers are being charged, the vents having respective valves 92 and 91. The containers 74, 76 are not themselves equipped with purge valves due to the hazard of purging concentrated zinc chloride.

The operating sequence to replace an exhausted container with a replacement container is as follows. In a first operating phase, the container 74 is initially completely filled with over-saturated zinc chloride solution while container 76 is charged with zinc chloride but has no water inside and is isolated from the system by appropriate valve settings. Water flows through the solenoid valve 82 and valve 84 into the container 74, pushing the discharged solution through valves 86 and 88 into the main stream via an injection point 89. Output concentration during a first phase when saturated zinc chloride solution is being pumped from the container is typically close to the theoretical saturation concentration of 1,560,000 ppm.

In a subsequent operating phase, the charge of zinc chloride in the container 74 is depleted and the concentration of the zinc chloride solution within the container 74 starts to fall. In this phase, the valves 88, 92 and 93 are closed while the valves 84, 86, 90 and 91 are opened. Further delivery of water to container 74 from the main stream then acts to push relatively concentrated solution out from the container 74 into the container 76. As the solution from the container 74 passes through the zinc chloride in the container 76, it becomes saturated and eventually fills the container 76. The remaining zinc in container 74, now at a relatively low concentration, is disposed of in one disposal method by closing valve 90 and opening valve 88 to permit flushing of the remaining zinc solution from the container 74 into the main line 70 and from there into the cooling tower so as to permit safe removal of the contents of the container 74. As an alternative to injecting the low concentration container contents into the cooling tower sump, and depending on the particular application, the solution to be disposed of can be subjected to further dilution by other means or can be subjected to a neutralizing reaction.

Valves 84, 86, 91 and 92 are then closed, allowing the container 74 to be safely removed and either replaced with another pre-charged container or re-filled with a further zinc chloride mass. Upon replacement, the container is initially isolated as the container 76 was initially isolated in the first operating phase. Valves 88, 90 and 93 are opened and the container 76 is used for normal dosing of the main fluid line until the container 76 starts to exhaust and changeover is again required.

Valves 84, 88 and 91 are then closed and valves 86, 90, 92 and 93 are opened allowing solution flow from container 76 to be diverted into the container 74 to fill it with concentrated solution with container 74 being vented through valve 92. In effect, the role of the two containers in the continuous flow process is reversed. Once container 74 is filled, the remaining solution in container 76 is discharged into the main line 70 by closing valves 84, 86, 91 and 92, and opening valves 88, 90 and 93. The container 76 is then replaced after closing valves 91, 93 and 90 and operation is returned to the initial mode: dosing from the container 74.

The operating parameters of the sub-system are chosen so that the flow of solution up through the inner tube of the containers 74, and 76 as they are being exhausted is at least close to being plug flow. Consequently, due to differences in viscosity and density, mixing in the container inner tube is minimized and an interface is created between incoming fresh water and outgoing zinc chloride solution. While some diffusion occurs across the interface and the concentration of zinc chloride drops over a volume that is somewhat larger than conventionally recognized to be plug in the sense of a plug flow, it is still relatively abrupt. As further pumping occurs, the container gradually de-saturates as the boundary passes out of the container.

In one embodiment of the invention, following depletion of the zinc chloride from container 74 and after discharging one volume of water from container 74 into container 76, a zinc chloride concentration within the exhausted container 74 is obtained which varies from a level of 280 ppm at the top of the inner tube, to 1530 ppm at the bottom of the cone with an average concentration of 834 ppm. In the particular application for addition to cooling tower recirculating water, the contents of the flushed container volume are blown into the cooling tower. One liter of the 834 ppm zinc in water solution diluted into a 56,700 liter tower results in an increase in zinc concentration of 0.015 ppm. This is a negligible increase and allows the container to be completely flushed of the remaining zinc, enabling a safe change over and no hazardous waste.

In the embodiments described, reference is made to "approaching exhaustion" of the container by which is meant that the charge of substance has been used up and the fluid exiting the container may no longer be a saturated solution of the substance in the fluid. Reference is made also to "exhaustion" or "full exhaustion" of the container by which is meant not only that the charge has been used up, but the solution has reached some low level of concentration which is satisfactory for the particular changeover procedure. It will be realized that in practice, the actual low level of concentration is a matter of choice which may depend on the nature of the dissolved substance and the requirements for disposal of the material in the exhausted container.

It will be appreciated that the principle of the invention can be adapted to canisters or other containers of any shape or size provided that the character of flow in the container is at least close to plug flow to minimize mixing of solutions of different concentrations. Whereas in the description of the preferred embodiment, the solute is a particulate solid, it will be realized that the invention is also applicable to other solute substances such as concentrated liquids, the container having a metering mechanism to meter an amount of the concentrated solute depending on the amount of solvent flowing through the container. In addition, the principles of the invention can also be used in an application in which the piped fluid is a gas instead of a liquid.

Whereas a particular configuration of pipes and valve position and operation has been described, it will be appreciated that other configurations of pipe sections, valve positions and valve operation can be implemented to obtain the desired container changeover sequence. Finally, it will be appreciated, that while the method and apparatus of the invention have particular application to the treatment of water in cooling tower systems, they can be used in the context of any system requiring periodic replenishment of source substances that are entrained as part of a fluid flow from the fluid source to a sink of a solution of the substance in the fluid.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. A method of handling a concentrated solution of a substance in a fluid comprising: flowing the fluid from a source into a first container containing a first charge of the substance to generate a solution of the substance in the fluid; flowing the solution from the first container to a sink; upon approaching exhaustion of the first container, flowing the solution from the first container into a second container containing a second charge of the substance to generate a solution of the substance of the second charge in the solution from the first container and flowing the solution from the second container to the sink; upon full exhaustion of the first container, isolating the first container from the flow of the fluid from the source by redirecting the fluid from the source to bypass the first container and to flow directly into the second container; and replacing the exhausted first container with a replacement first container containing a third charge of the substance, venting the second container during the course of generating the solution in the second container, and flowing solution from the first container into a main fluid line extending from the source to the sink once the second container is filled with the generated solution.

2. A method as claimed in claim 1, further comprising, continuing to direct the fluid from the source into the second container; upon approaching exhaustion of the second container, flowing the fluid from the second container into the replacement first container to generate a solution of the substance of the third charge in the solution from the second container; upon full exhaustion of the second container, isolating the second container from the flow of the fluid from the source by redirecting the fluid to bypass the second container and to flow directly into the replacement first container; and replacing the exhausted second container with a replacement second container containing a fourth charge of the substance.

3. A method as claimed in claim 2, further comprising venting the replacement first container during the course of generating the solution in the replacement first container, and flowing solution from the second container into the main fluid line once the replacement first container is filled with such generated solution.

4. A method as claimed in claim 3, further comprising repeating the sequence of steps to effect alternating full exhaustion of the first and second containers and replacement thereof by respective replacement first and second containers containing charges of the substance.

5. A method as claimed in claim 4, further comprising configuring fluid flow to obtain flow through the containers which is at least close to being a plug flow presenting low mixing along the course of the fluid flow through the containers.

6. A method as claimed in claim 4, wherein the substance is a particulate solid that is dissolved by passage of the fluid therethrough.

7. A method as claimed in claim 4, wherein the substance is highly soluble in the fluid, and the solution exiting each container other than during approaching exhaustion and full exhaustion of the container is saturated with the substance.

8. A method as claimed in claim 6, wherein the particulate solid is zinc chloride and the fluid is water.

9. Apparatus for handling a concentrated solution of a substance in a fluid comprising a source of the fluid, a sink for the fluid, and a sub-system in fluid communication with the source and the sink, the sub-system having a first container for containing a first charge of the substance, a second container for containing a second charge of the substance, and a plurality of pipe sections and a plurality of valves, each valve selectably operable to open and close, respectively to permit and to prevent flow of solution through a respective associated one of the pipe sections, the pipe sections and valves having a first configuration to flow fluid from the source into the first container to generate a solution of the substance in the fluid and for flowing the solution from the first container to the sink, having a second configuration to flow the solution from the first container into the second container to generate a solution of the substance of the second charge and to flow the solution from the second container to the sink, and having a third configuration to flow the fluid from the source directly into the second container whereby to isolate the first container from the flow of the fluid from the source and to permit replacement of the first container by a replacement first container, the pipe sections and the valves having a fourth configuration to flow the solution from the second container into the replacement first container to dissolve the substance of the replacement first container and to flow the solution from the replacement first container to the sink, and having a fifth configuration to flow the fluid from the source directly into the first replacement container and to isolate the second container to permit replacement thereof by a replacement second container containing a fourth charge of the substance.

\* \* \* \* \*